April 3, 1928.  
H. J. BAKER  
BEAM HANGER  
Filed July 12, 1926  
1,664,499  
3 Sheets-Sheet 1
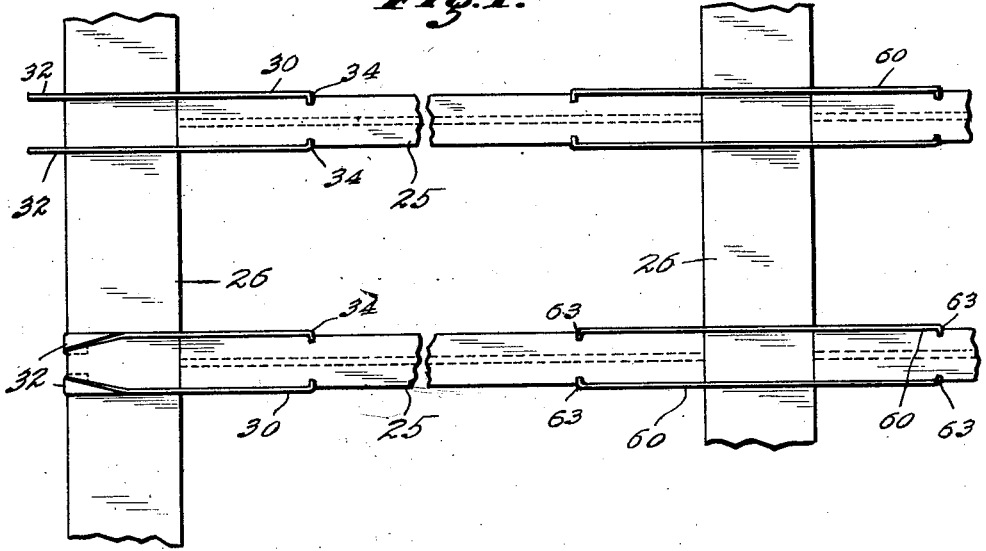
Fig.1.
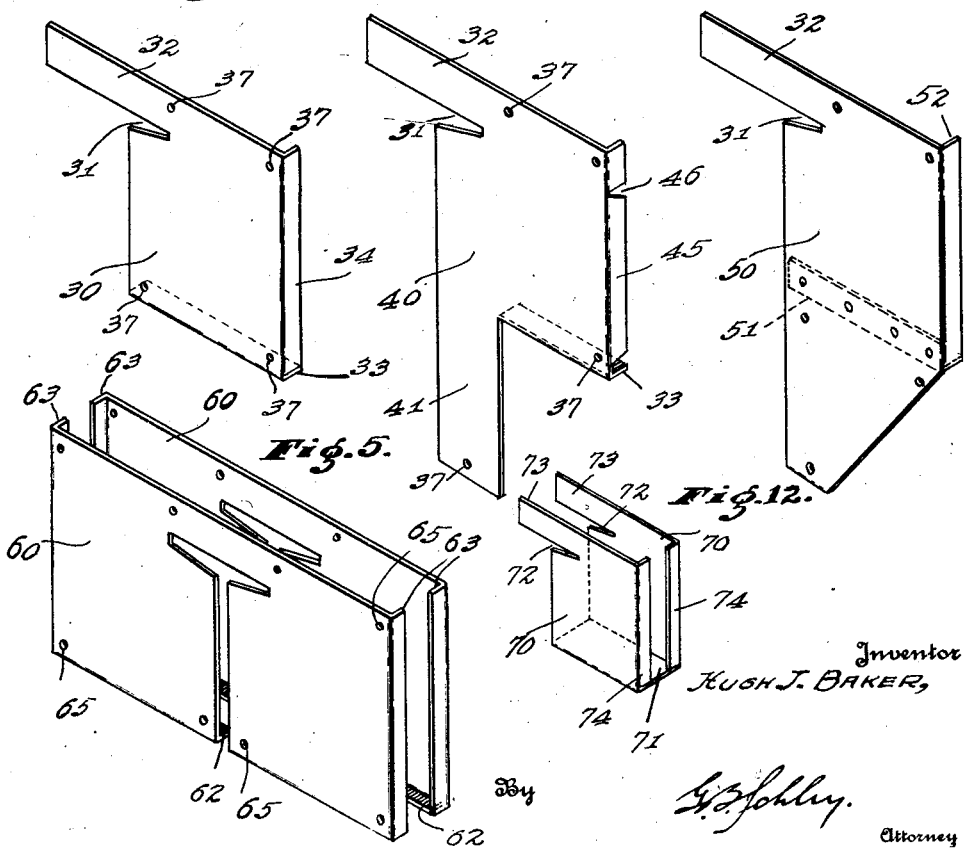
Fig.2. Fig.3. Fig.4.
Fig.5. Fig.12.
Inventor  
Hugh J. Baker,  
By G. B. Schley.  
Attorney

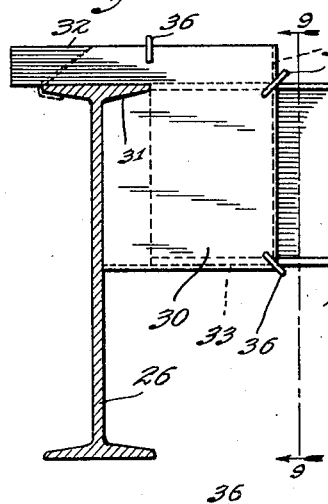
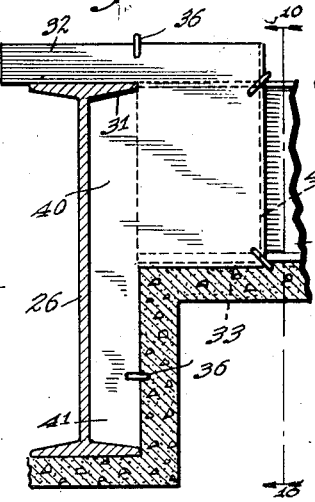
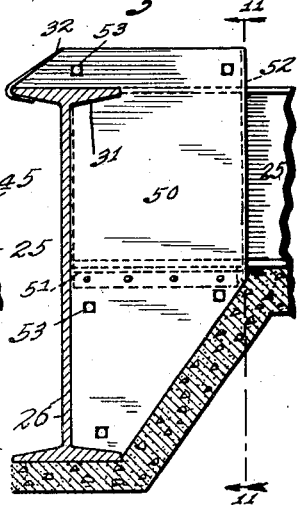
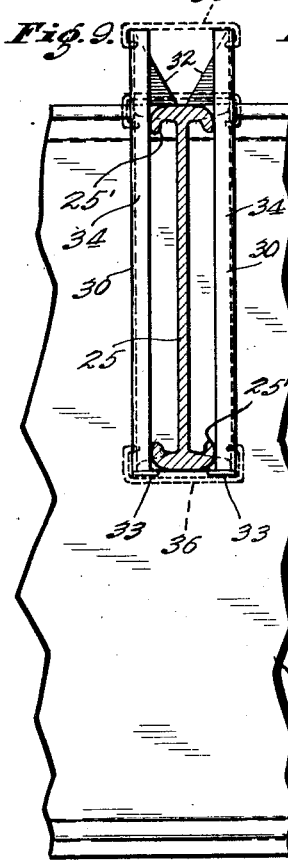
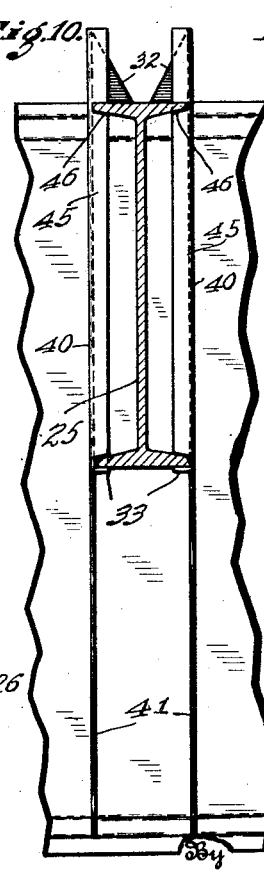
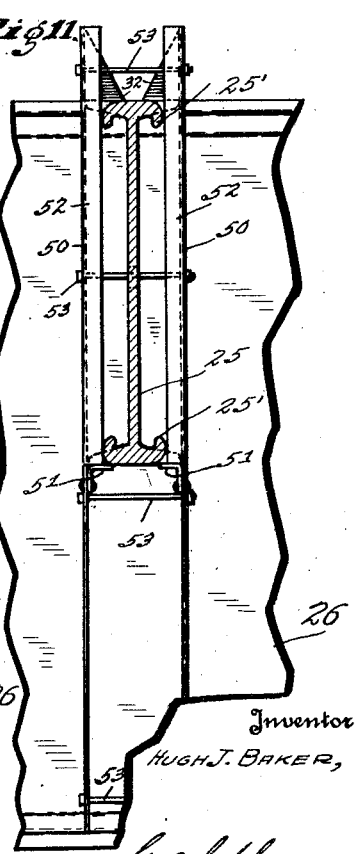

April 3, 1928.  1,664,499
H. J. BAKER
BEAM HANGER
Filed July 12, 1926  3 Sheets-Sheet 3
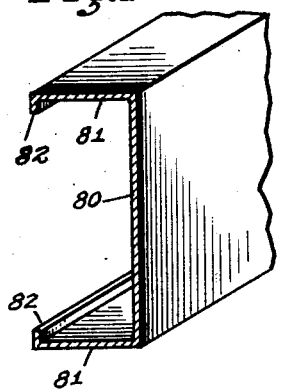
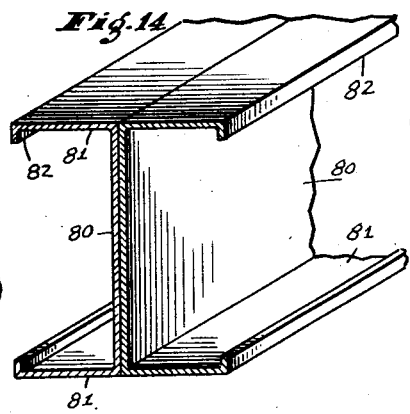
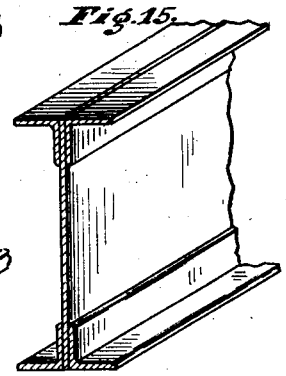
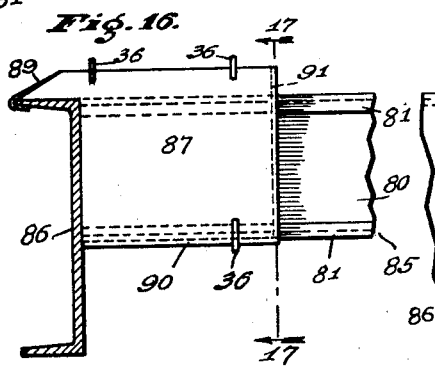
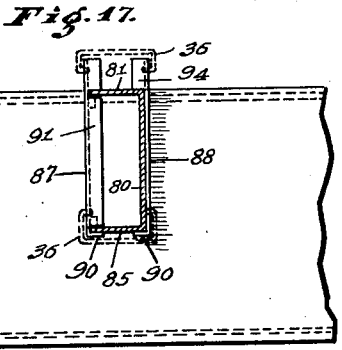
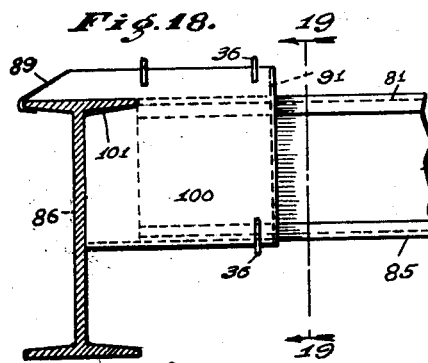
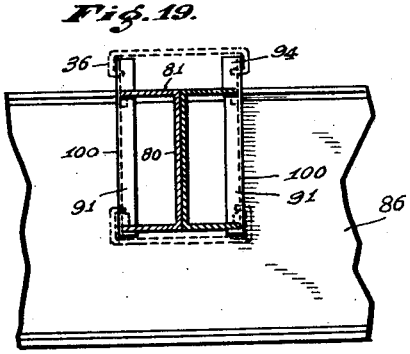
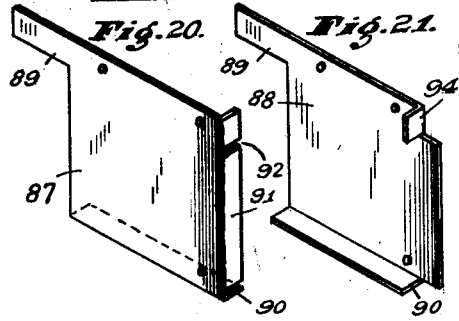
Inventor
HUGH J. BAKER,
By G. B. Schley
Attorney Patented Apr. 3, 1928.

1,664,499

UNITED STATES PATENT OFFICE.

HUGH J. BAKER, OF INDIANAPOLIS, INDIANA.

BEAM HANGER.

Application filed July 12, 1926. Serial No. 121,782.

It is the object of my invention to provide a simple and economical means for connecting together the various members of a structure fabricated of beams, and particularly of relatively light metal beams of the type commonly known as "metal lumber." More specifically, it is my object to produce a means which may be employed in attaching joists to their supporting girders.

A further object of my invention is to produce such a connecting and supporting means which can be easily and quickly applied without the necessity of elaborate tools.

I accomplish the above object by providing for each end of each joist a sheet-metal bracket which is carried by the girder and serves to form a support for the joist, and which in addition preferably serves to tie the joist-end firmly to its associated girder.

The accompanying drawings illustrate my invention: Fig. 1 is a plan view of a construction to which my invention is applicable; Figs. 2, 3, 4, and 5 illustrate various forms of sheet metal members which I may employ in effecting the connection between the joists and girders; Figs. 6, 7, and 8 are side elevations illustrating the application respectively of the attaching members illustrated in Figs. 2, 3, and 4 to a rolled I-beam; Figs. 9, 10, and 11 are sections respectively on the lines 9—9, 10—10, and 11—11 of Figs. 6, 7, and 8; Fig. 12 is a perspective view of a one-piece bracket embodying my invention; Figs. 13, 14, and 15 show other forms of structural beams to which my invention may be applied; Fig. 16 is an elevation of a joint between a joist of the form illustrated in Fig. 13 and a standard rolled channel girder; Fig. 17 is a section on the line 17—17 of Fig. 16; Fig. 18 is an elevation of the joint between a joist of the form illustrated in Fig. 14 and a rolled I-beam girder; Fig. 19 is a section on the line 19—19 of Fig. 18; and Figs. 20, 21, and 22 are perspective views showing disassembled the joist and supporting brackets which are shown assembled in Figs. 16 and 17.

My invention is particularly adapted for use in connection with joists 25 which extend between supporting girders 26 as shown in Fig. 1. In the construction illustrated in the drawings, the tops of the joists are substantially flush with the tops of the girders, but it will be evident that this is not essential to the application of my invention.

One form of support or hanger which my invention contemplates is illustrated in Figs. 2, 6, and 9. This form is one of several which may be used in connection with rolled I-beams. This hanger comprises two sheet-metal brackets 30 adapted to lie against the edges of the flanges of the joist 25. Each bracket 30 is provided with a notch 31 which is adapted to receive the upper flange of the girder 26, and above the notch 31 there is an extension 32 of sufficient length to overlie and extend beyond the upper flange of the girder 26. Along its bottom edge the bracket 30 has an in-bent horizontal flange 33 which is adapted to engage the under side of the lower flange of the joist 25 to form a step or seat for the support of the joist. Preferably, the bracket 30 is also provided at its outer vertical edge with an in-bent flange 34. To tie the joist to the girder 26, I notch the joist-flanges to receive the flanges of the brackets, as is evident from Fig. 9. This may conveniently be accomplished by cutting through each edge of each joist-flange in two places and bending the material of the flange between such cuts to form lips 25'.

As illustrated in Figs. 1, 6, and 9, two of the brackets 30 are provided for the support of one end of each joist 25. The two brackets 30 lie on opposite sides of the joist 25 with the extensions 32 extending over the top of the supporting girder 26. When the joist is in place, the extensions 32 may be twisted and their ends bent over the outer edges of the girder 26 to hold the bracket in place on the girder as illustrated in Fig. 1 and in dotted lines in Fig. 6. The two brackets 30 can be held against the joist 25 by any suitable clamping means such for instance as the wire clips 36, the ends of which enter holes 37 in the brackets.

This bracket 30 forms a support for the end of the joist 25 and serves to hold or tie the joist against the face of the girder 26.

The bracket 40 illustrated in Figs. 3, 7, and 10 is somewhat similar to the bracket 30 in that it has the notch 31, the extension 32, and horizontal flange 33, similar to the correspondingly numbered parts of the bracket 30. The bracket 40, however, differs from the bracket 30 in that it is provided with a downwardly extending leg 41 of sufficient length to engage the upper side of the lower flange of the girder 26. The outer vertical edge of the body of the bracket 40 may be bent inward to form a vertical flange 45 which may, if desired, be continuous like the flange 34 of the bracket 30; but I have illustrated the flange 45 as provided with a notch 46 and as having its lower end spaced from the horizontal flange 33 to provide for the reception of the un-notched flanges of the joist. The bracket 40 has a disadvantage in that it does not operate to hold the joist 25 against the face of the girder 26; but it may be used in situations where it is desired to avoid notching the joist flanges. The bracket 40 may be held in place against the sides of the joist by means of the wire clips 36.

Still another form of joist-supporting means is illustrated in Figs. 4, 8, and 11. In this construction, the bracket 50 is provided with a notch 31 and an extension 32 similar to the correspondingly numbered parts of the brackets 30 and 40. The bracket 50 has sufficient height so that its lower edge rests on the upper face of the lower flange of the girder 26. Attached to the face of the bracket 50 is a horizontally extending step 51 which may conveniently be of angle-iron and which provides a support for the lower flange of the joist 25. Above the step 51, the outer vertical edge of the member 50 is bent inward to provide a flange 52. The flange 52 may be continuous, as illustrated, and may enter notches formed in the joist flanges.

The bracket 50 is used in substantially the same way as are the brackets 30 and 40. Two of the brackets 50 are disposed on opposite sides of the joist 25 at the end thereof with their extensions 32 overlying the supporting girder 26 and with the lower flange of the joist 25 resting on the steps 51. The ends of the extensions 32 may be twisted and bent down over the edge of the upper flange of the girder 26, and the two brackets 40 held in place by the wire clips 36 or by bolts 53.

On girders from which joists extend oppositely, I may employ the brackets 60 illustrated in Fig. 5 and at the right in Fig. 1. Each of such brackets comprises a metal plate cut out centrally to receive the upper flange and a portion of the web of the girder 26. The bottom edges of the brackets 60 are bent inward to form flanges 62 upon which the joists 25 rest. Desirably the vertical edges of the brackets 60 are also in-bent to form vertical flanges 63 which may enter notches formed in the joist flanges. The brackets 60, when in place, may be held against their associated joists by means either of the clips 36 or the bolts 63; and to this end, the brackets 60 may be provided with holes 65.

The joist-support illustrated in Fig. 12 is formed of a single piece of sheet-metal which is bent into a U-shaped cross-section to form side portions 70 and a bottom portion 71 which forms a seat for the joist. The side portions 70 are notched as at 72 for the reception of the top girder flange and are provided with extensions 73 which are adapted to extend over the top surface of the girder. Opposite their notched sides, the vertical edges of the side portions 70 are bent inward to form vertical flanges 74 which may be received in notches in the flanges of the joist as indicated in Fig. 11 in connection with the brackets 60.

The forms of joist-supports described above have been illustrated as used in connection with rolled I-beams of the usual shape. It will be evident that my invention is applicable to structural forms other than the I-beams heretofore considered. By way of example of different structural shapes to which my invention may be applied, I have illustrated in Figs. 13, 14, and 15 beams having different cross-sections. The beam illustrated in Fig. 13 is a channel in which the outer edges of the flanges are in-turned to provide for additional strength and rigidity. Fig. 14 illustrates an I-beam constructed by welding or otherwise fastening together two of the channels illustrated in Fig. 13. The I-beam illustrated in Fig. 15 is built up of a flat web and four angle-irons secured to the web at the edges thereof.

In Figs. 16 to 22 inclusive I have illustrated the application of my invention to structural shapes such as those illustrated in Figs. 13 and 14. The form of beam shown in Fig. 15 so closely approximates those illustrated in Figs. 1 to 12 that the application of my invention thereto is self evident and I have therefore made no attempt to illustrate it.

Figs. 16, 17, 20, 21, and 22 illustrate how a joist-support of my invention may be employed in connection with joists of the channel form illustrated in Fig. 13. Such a channel comprises a web 80 and upper and lower flanges 81. The outer edges of the flanges 81 are in-turned to form strengthening ribs or supplementary flanges 82. To support a joist 85 of this type from a girder 86, I employ joist-supporting brackets 87 and 88 of the form illustrated in Figs. 16 and 17, 20, and 21. Both of the brackets 87 and 88 are provided with extensions 89 which are adapted to extend over the top of the girder 86 and to be bent over the outer edges thereof as is clear from Fig. 16. Both brackets also have along their lower edges horizontal flanges 90 which form seats or steps on which the joist 85 is carried. The bracket 87, which is the bracket on the flanged side of the joist 85, may be in-bent along its outer vertical edge to form a flange 91. The flange 91 may be notched as at 92 and have its lower end spaced from the horizontal flange 90 to provide spaces for the reception of the joist-flanges 81. The supplementary flanges 82 of the joist are notched as at 92 to receive the flange 91 of the bracket 87. If desired, the bracket 88 may be provided at its upper outer corner with an in-bent ear 94 which overlies the top flange of the joist 85. The brackets 87 and 88 may be held in position against the sides of the joist 85 by any suitable means such, for instance, as the wire clips 36.

Since the flange 91 is received within the notches 93 in the supplementary flange 82 of the joist, and since in assembling the joist the extensions 89 are bent over the far edge of the girder 86, the joist will be held securely against the face of the girder and at the same time supported by the flanges 90 on the brackets 87 and 88.

The beam illustrated in Fig. 14 is formed of two of the channels illustrated in Fig. 13, such channels being placed back to back and held together as by welding. The brackets 100 used in connection with I-beam joists of the form illustrated in Fig. 14 may conveniently be of the type shown in Figs. 18 and 19. Both of the brackets 100 may be similar to the bracket 87 illustrated in Fig. 20 except that their rear edges may be provided with notches 101 below the extensions 89 for the reception of the upper girder flange. The brackets 100 have the vertical flanges 91, which flanges may interlock with the flanges of the joist in the manner illustrated in Figs. 20 and 22. If it is not convenient to notch both the bracket-flanges and the joist flanges, the joist flanges may be notched to a depth sufficient to receive the un-notched bracket-flange in a manner analogous to that illustrated in Figs. 9 and 11; or the bracket flange may be provided with notches of sufficient width to receive the unaltered flanges of the joist in a manner analogous to that illustrated in Figs. 3 and 10.

It will be evident that my invention is capable of a wide variety of modifications, only a few of which I have attempted to illustrate and describe. All the beam-connecting members illustrated have, however, certain features in common. They are simple and economical to manufacture; they provide an adequate support for the joists; in the preferred form, in which a bracket-flange enters a notch in a joist-flange, the joist is securely tied to the face of the girder; and the brackets may be readily attached with the use of simple and few tools. Although I have illustrated each hanger as having portions lying on opposite sides of the supported joist it will be evident that it might be convenient under certain circumstances to use a single bracket for a hanger.

I claim as my invention:

1. A bracket for supporting a joist from a girder, said joist having one or more longitudinal flanges, said bracket being formed of sheet metal and cut out to fit against one side and over the top of the girder, said bracket being provided with a seat adapted to receive and support the joist, the material of said bracket being bent along the outer vertical edge to form a flange, the flanges of said joist being notched for the reception of said bracket flange.

2. A bracket for supporting a joist from a girder, said bracket being formed of sheet metal and cut out to fit against one side and over and beyond the top of the girder, said bracket being provided with a seat adapted to receive and support the joist, that part of said bracket which projects over and beyond the girder having a portion which is adapted to extend below the upper surface of the girder on the far side thereof to tie the bracket to the girder.

3. A bracket for supporting a joist from a girder, said bracket being formed of sheet metal and cut out to fit against one side and over the top of the girder, said bracket being provided with a seat adapted to receive and support the joist, the outer vertical edge of said bracket being bent to form an interlocking flange.

4. A bracket for supporting a joist from a girder, said bracket being formed of sheet metal and cut out to fit against one side and over the top of the girder, the material of said bracket along a bottom longitudinal edge being bent at a right-angle to the body of the bracket to form a seat adapted to receive and support the joist, the outer vertical edge of said bracket being bent to form an interlocking flange.

In witness whereof, I have hereunto set my hand at Indianapolis, Indiana, this 6th day of July, A. D. one thousand nine hundred and twenty-six.

HUGH J. BAKER.